United States Patent Office 3,197,424
Patented July 27, 1965

3,197,424
PIGMENTED COATING COMPOSITION
AND PROCESS
Victor J. Larson, Wilmington, Del., assignor to Hercules Powder Company, Wilmington, Del., a corporation of Delaware
Filed Feb. 21, 1962, Ser. No. 174,711
The portion of the term of the patent subsequent to Jan. 1, 1980, has been disclaimed
12 Claims. (Cl. 260—16)

The present application is a continuation-in-part of my copending application Serial No. 805,355, filed April 10, 1959, now abandoned, entitled Pigmented Coating Composition and Process.

The present invention relates to new and improved coating compositions and process of making, and more particularly to such compositions and process wherein ethyl hydroxyethyl cellulose (EHEC) is employed as a flatting agent to produce enamels of any desired degree of flatness.

The terms varnish, alkyd, and resin solution or hard resin solution are used herein to mean oleoresinous varnish, oil-modified phthalic ester, and spirit varnish, respectively. These are well recognized and frequently used terms in this art. See for example the National Paint Dictionary, and Organic Coating Technology, volume 1, entitled Oils, Resins, Varnishes and Polymers, 1954, by Henry F. Payne, John Wiley and Sons, New York, New York; and especially pages 191 and 269 of the latter.

Heretofore the flatness of enamels has been varied by varying the pigment volume concentration (PVC) used in the enamel, and although this can be accomplished with prime or color (i.e. hiding) pigments alone, inert or extender pigments (e.g. silica, magnesium silicate, china clay, diatomaceous silica) are sometimes used in combination with prime or color pigments for this purpose. In either event, however, this has several disadvantages. A quite serious disadvantage is that it requires grinding a separate paste for each desired degree of flatness of the enamel and this in turn means a large investment in an inventory of many different pigments, grinding equipment and labor. A further disadvantage of the prior art practice is that the pigments tend to settle out of the final enamel compositions on standing and therefore must be stirred frequently while being used in order to obtain a uniform and proper degree of flatness. Settling also occurs during storage and this causes an increase in gloss, especially in semigloss and satin enamels. Use of the term prime pigments herein is intended to include color pigments also.

An objective of this invention is a new and improved coating composition and process of making same. Another objective is to provide a process of preparing coating compositions which dry to a semigloss, satin or flat finish. An additional objective is to provide such a process wherein a novel flatting agent is employed. A still further objective is to provide a process of making enamels having any desired degree of flatness with a single paste, thereby eliminating separate grinding for each degree of flatness desired. The above and other objective will be apparent from the description of this invention given hereinafter.

I have found that the above disadvantages can be eliminated or minimized and that the above objectives can be accomplished by employing EHEC as a flatting agent in preparing pigmented coating compositions which dry to any desired degree of flatness, which process comprises dispersing EHEC in a carrier therefor, thinning the EHEC dispersion to the desired nonvolatile content by adding thereto either a petroleum aliphatic naphtha or said naphtha plus an aromatic hydrocarbon to form a flatting base, and incorporating with the EHEC flatting base a paste comprising a mixture of a prime pigment and a normally glossy drying nonaqueous organic film-forming vehicle selected from the group consisting of oleoresinous varnishes, oil-modified phthalic esters, spirit varnishes, the petroleum naphtha and aromatic hydrocarbon being a solvent for all film-forming vehicles employed. Also, mixtures of two or more of these film-forming vehicles may be used.

I have found that before the EHEC can be mixed with the film forming vehicle and serve properly as a flatting agent, the EHEC must be incorporated in some sort of carrier therefor. Preparing a colloidal dispersion of EHEC in an unbodied drying oil serves this purpose well. Then the EHEC dispersion is thinned to the desired nonvolatile content with either a petroleum aliphatic naphtha or said naphtha plus an aromatic hydrocarbon. The thinner must be a solvent for the film former employed. This completes the preparation of the EHEC flatting base.

One means of carrying out this invention according to a preferred embodiment thereof comprises heating an unbodied drying oil to a temperature of approximately 450° F., adding a low-viscosity EHEC slowly to the hot oil with agitation, maintaining the temperature of the mixture between about 430° F.–460° F. (desirably as near 450° F. as practical) and continuing to agitate until the dispersion is substantially complete. This usually requires about 15 minutes after completing the addition of EHEC and is indicated by forming a clear pill when a drop of the dispersion is placed on a cold glass plate. When the preparation of the EHEC dispersion has been completed, it is thinned to the desired nonvolatile content by adding to it a petroleum aliphatic naphtha, e.g. mineral spirits, and preferably the resulting mixture is screened as through a cheese cloth. This gives the final EHEC flatting base.

Next a pigment paste is prepared by grinding a mixture of film forming vehicle and a prime pigment, such as e.g. rutile titanium dioxide. This uniformly incorporates the pigment in the vehicle. The final coating composition is then made by mixing additional film-forming vehicle with the pigment paste and incorporating the resulting mixture with the EHEC flatting base. Various driers and other additives may also be used. The resulting coating composition is brushed, sprayed or otherwise applied to a surface and dried either at room temperature or elevated temperature to give an enamel film of any desired degree of flatness.

Thus the present invention provides an accurate and efficient means of producing enamel coating compositions which dry to films having any desired degree of flatness. As will be shown more fully hereinafter, the degree of flatness is dependent on a number of factors including the EHEC/oil ratio in the dispersion, concentration of the EHEC-oil dispersion in the final coating composition, the solvent employed, and also the film-forming vehicle employed.

The following examples illustrate the invention, but they are not intended to limit it. In the examples percent as applied to PVC is by volume, otherwise percent is by weight. In the examples ratios and parts are also by weight. The kauri-butanol (KB) solvency values disclosed in this application were determined by employing the method of ASTM Specification Number D1133–54T. All gloss readings were taken with a 60° photovolt glossmeter.

EXAMPLE 1.—FLAT ALKYD ENAMEL

*Preparation of EHEC flatting base No. 1*

100 parts of alkali refined linseed oil was heated to 450° F. 40 parts of low-viscosity EHEC was slowly added to the oil while agitating and maintaining the temperature of the mixture between 430° F.–460° F. Agitation was continued and the temperature of the mixture kept within this range for about 15 minutes after completing the addition of EHEC. This gave a colloidal dispersion of the EHEC in the oil and the fact that a drop of the dispersion on a cold glass plate was clear indicated that the dispersion was substantially complete. The resulting dispersion was thinned to a 25% nonvolatile content by mixing in 420 parts of mineral spirits having a KB of 36–38.

*Preparation of pigment paste No. 1*

300 parts of rutile titanium dioxide pigment was ground into 150 parts of the 60% TOFA–PE alkyd vehicle in Table 1 below on a laboratory 3-roll mill to a fineness of 6 to 7 grind as measured by the North fineness gauge.

*Preparation of final coating composition*

The resulting EHEC flatting base No. 1 and pigment paste No. 1 plus additional amounts of the vehicle, as defined above in this example, were mixed to make the final coating compositions shown in Table 1 below. Thus, a gloss enamel was prepared using the above paste and additional amounts of the above vehicle, and also a flat enamel was made in a similar manner but with flatting base added (Films A and B, respectively, in Table 1 below).

When the above final coating compositions were brushed on primed wood or paperboard panels, both enamels dried at room conditions in 16 hours to a hard, tack-free finish. The composition without the EHEC gave a high gloss finish, whereas the composition with the EHEC gave a flat finish, as judged visually.

Further details are given in Table 1 below.

TABLE 1

| Films | Parts | |
|---|---|---|
| | A | B |
| Ingredient: | | |
| Pigment paste No. 1 | 180 | 180 |
| 60% TOFA [1]–PE [2] Alkyd Vehicle (50% NV in MS) [3] | 180 | 100 |
| EHEC flatting base No. 1 (25% NV in MS) | | 320 |
| Total | 360 | 600 |
| PVC, percent | 20 | 20 |
| Type fim produced | High gloss | Flat |

[1] Tall oil fatty acid of low resin acids content, i.e. about 1%–4% resin acids.
[2] Pentaerythritol.
[3] Contained drier (0.5% lead, 0.07% cobalt, 0.10% calcium as metals based on NV of TOFA–PE alkyd vehicle).
NV means nonvolatile. MS means mineral spirits.

EXAMPLE 2.—FLAT ALKYD ENAMEL

*Preparation of EHEC flatting base No. 2*

Using the same procedure as used in Example 1 for preparing flatting base No. 1, flatting base No. 2 was prepared with 100 parts dehydrated castor oil having a Gardner-Holdt viscosity of G–H, 100 parts of low-viscosity EHEC and 600 parts mineral spirits having a KB solvency value of 36–38.

*Preparation of final coating composition*

The above flatting base No. 2 and the same pigment paste as used in Example 1 were mixed in varying amounts to make the coating compositions in Table 2 below. As will be noted, no flatting base was used in making Film A.

When the above final coating compositions were brushed on primed wood or paperboard panels and allowed to dry under room conditions, finishes ranging from a high gloss to a dead flat were obtained.

Further details are given in Table 2 below.

TABLE 2

| Films | Parts | | | | |
|---|---|---|---|---|---|
| | A | B | C | D | E |
| Ingredient: | | | | | |
| Pigment paste No. 1 | 75 | 75 | 75 | 75 | 75 |
| 60% TOFA–PE alkyd vehicle (50% NV in MS) [1] | 75 | 62.4 | 58.2 | 50 | 25 |
| EHEC flatting base No. 2 (25% NV in MS) | | 25.2 | 33.6 | 50 | 100 |
| Total | 150 | 162.6 | 166.8 | 175 | 200 |
| % EHEC-DCO in vehicle | None | 12.5 | 16.6 | 25 | 50 |
| EHEC-DCO/vehicle ratio | None | 1/7 | 1/5 | 1/3 | 1/1 |
| PVC, percent | 20 | 20 | 20 | 20 | 20 |
| Gloss reading | 86 | 40 | 29 | 10 | 3 |

[1] Contained drier (0.5% lead, 0.07% cobalt, 0.10% calcium as metals based on NV of TOFA–PE alkyd).
DCO means dehydrated castor oil. PVC means pigment volume concentration.

EXAMPLE 3.—FLAT ALKYD ENAMEL

*Preparation of pigment paste No. 2*

50 parts of rutile titanium dioxide was mixed with 12.5 parts of the Duraplex D65A alkyd vehicle (70% NV) in Table 3 below and the mixture ground on a laboratory 3-roll mill to a fineness of 6 to 7 grind as measured by the North fineness gauge. The paste was thinned with 12.5 parts mineral spirits having a KB of 36–38.

*Preparation of final coating composition*

The resulting EHEC flatting base No. 2 and pigment paste No. 2 plus additional amounts of the vehicle, as defined above in this example, were mixed in varying amounts to make the final coating compositions shown in Table 3 below. As will be noted, Film A contained no flatting base.

When the above final coating compositions were brushed on prime wood or paperboard panels and allowed to dry at room conditions, finishes ranging from a high gloss to a dead flat were obtained.

Further details are given in Table 3 below.

TABLE 3

| Films | Parts | | | | |
|---|---|---|---|---|---|
| | A | B | C | D | E |
| Ingredient: | | | | | |
| Pigment paste No. 2 | 75 | 75 | 75 | 75 | 75 |
| Duraplex D65A vehicle (70% NV in MS) | 53.6 | 44.8 | 41.6 | 35.7 | 17.9 |
| EHEC flatting base No. 2 (25% NV in MS) | | 25.2 | 33.6 | 50 | 100 |
| Total | 128.6 | 144.8 | 150.2 | 160.7 | 192.9 |
| Percent EHEC-DCO in vehicle | None | 12.5 | 16.6 | 25 | 50 |
| EHEC-DCO/vehicle ratio | None | 1/7 | 1/5 | 1/3 | 1/1 |
| PVC, Percent | 20 | 20 | 20 | 20 | 20 |
| Gloss reading | 89 | 61 | 49 | 23 | 8 |

EXAMPLE 4—FLAT VARNISH

*Preparation of EHEC flatting base No. 3*

Using the same procedure as used in Example 1 for preparing flatting base No. 1, flatting base No. 3 was prepared with 100 parts dehydrated castor oil having a Gardner-Holdt viscosity of G-H, 100 parts of low viscosity EHEC, 386.4 parts mineral spirits and 213.6 parts toluene with a combined KB of 60 to give a nonvolatile content of 25%.

*Preparation of pigment paste No. 3*

Using the same procedure as used in Example 1 for preparing pigment paste No. 1, pigment paste No. 3 was prepared with 400 parts of rutile titanium dioxide pigment and 200 parts of phenolic resin [1]-tung oil varnish [2] vehicle.

*Preparation of final coating composition*

The above EHEC flatting bases Nos. 2 and 3, and pigment paste No. 3 were mixed to make the coating compositions of Table 4 below.

When the above final coating compositions were brushed on primed wood or paperboard panels and allowed to dry at room conditions, they formed finishes having the gloss readings shown in Table 4 below.

TABLE 4

| Films | Parts | |
|---|---|---|
| | A | B |
| Ingredient: | | |
| Pigment paste No. 3 | 60 | 60 |
| EHEC flatting base No. 2 (25% NV in MS) | 20 | |
| EHEC flatting base No. 3 (25% NV in MS and Toluene) | | 20 |
| Total | 80 | 80 |
| Percent EHEC-DCO in vehicle | 33⅓ | 33⅓ |
| EHEC-DCO/vehicle ratio | 1/2 | 1/2 |
| PVC, percent | 40 | 40 |
| Gloss reading | 25 | 50 |

EXAMPLE 5.—FLAT ALKYD ENAMEL

This example shows use in a flat alkyd enamel of extra low viscosity EHEC (Film A), low viscosity EHEC (Film B), and a mixture of pigment with film forming vehicle (Film C).

*Preparation of flatting bases Nos. 4 and 5*

Using the same procedure as used in Example 1 for preparing EHEC flatting base No. 1, the EHEC flatting bases in Table 5 below were prepared with 100 parts dehydrated castor oil having a Gardner-Holdt viscosity of G-H, 100 parts flatting agent and 600 parts mineral spirits with a KB of 36–38 to give a nonvolatile content of 25%.

*Preparation of pigment paste No. 4*

Using the same procedure as used in Example 1 for preparing pigment paste No. 1, pigment paste No. 4 was prepared with 200 parts of rutile titanium dioxide pigment and 100 parts of the Duraplex D65A alkyd vehicle (70% NV) in Table 5 below.

*Preparation of final coating composition*

The resulting flatting bases and pigment pastes were mixed in the amounts shown in Table 5 below to give the final coating compositions shown.

When the above final coating compositions were brushed on primed wood and paperboard panels and allowed to dry at room conditions, they formed finishes having the gloss readings shown in Table 5 below.

[1] Ester gum modified phenolic resin.
[2] Contained drier (0.5% lead, 0.05% cobalt, 0.05% manganese as metals based on tung oil).

TABLE 5

| Films | Parts | | |
|---|---|---|---|
| | A | B | C |
| Ingredients: | | | |
| Pigment paste No. 4 | 75 | 75 | 150 |
| Duraplex D65A vehicle (23% NV in MS) | 17.9 | 1..9 | 65 |
| Flatting agent: | | | |
| EHEC (XL Visc.[1]) | | | |
| EHEC (L Visc.[2]) | | | |
| Flatting base No. 4 (25% NV in MS) | 100 | | |
| Flatting base No. 5 (25% NV in MS) | | 100 | |
| Total | 192.9 | 192.9 | 215 |
| Percent FA [3]-DCO in vehicle | 50 | 50 | None |
| FA-DCO/vehicle ratio | 1/1 | 1/1 | None |
| PVC, percent | 20 | 20 | 20 |
| Gloss reading | 26 | 7 | 90 |

[1] Extra low viscosity. [2] Low viscosity. [3] Flatting agent.

EXAMPLE 6.—FLAT RESIN SOLUTION ENAMEL

*Preparation of pigment paste No. 5*

300 parts of rutile titanium dioxide was mixed with 150 parts of a pentaerythritol-wood rosin-ester gun-solution (60% NV in MS) and ground on a laboratory 3-roll mill to a fineness of 6 to 7 grind as measured by the North fineness gauge.

*Preparation of final coating composition*

The above pigment paste No. 5 and the same EHEC flatting base No. 2 as used in Example 2 were mixed to make the coating composition used in making film A in Table 6 below. The coating composition used in making film B in Table 6 below was made in the same manner except no flatting base was added.

When the above final coating compositions were brushed on primed wood or paperboard panels and allowed to dry at room temperature, both dried to a hard tack-free finish. The composition without the EHEC gave a high gloss finish, whereas the composition with the EHEC gave a flat finish, as judged visually.

Further details are given in Table 6 below.

TABLE 6

| Films | Parts | |
|---|---|---|
| | A | B |
| Ingredient: | | |
| Pigment paste No. 5 | 75 | 75 |
| Resin Solution (60% NV in MS) | 50 | 50 |
| EHEC flatting base No. 2 (25% NV in MS) | 80 | |
| MS | 10 | 10 |
| Total | 215 | 135 |
| Percent EHEC-DCO in vehicle | 31.0 | |
| EHEC-DCO/vehicle ratio | 1/2.35 | |
| Percent PVC | 20 | |

EXAMPLE 7.—FLAT ALKYD ENAMEL

Example 7 was carried out as a control (i.e. without using a flatting base) for the following Examples 8–13. For ease of comparison, this same control experiment of Example 7 above will be used (as Film A) in each of the Tables 7–12 hereinafter.

*Preparation of final coating composition*

The same pigment paste No. 1 and additional amounts of the same alkyd vehicle of Example 1 were mixed.

When the above final coating composition was brushed on primed wood or paperboard panels and allowed to dry under room conditions, a high gloss finish was obtained.

Further details are given in Tables 7–12 hereinafter (Film A).

EXAMPLE 8.—FLAT ALKYD ENAMEL

*Preparation of final coating composition*

The same pigment paste No. 1, the same EHEC flatting base No. 1 and an additional amount of the same alkyd vehicle of Example 1 were mixed.

When the above final coating composition was brushed on primed wood or paperboard panels and allowed to dry under room conditions a flat finish was obtained.

Further details are given in Table 7 below.

TABLE 7

| Films | Parts | |
|---|---|---|
| | A[1] | B |
| Ingredient: | | |
| Pigment paste No. 1 | 50 | 50 |
| 60% TOFA-PE alkyd vehicle (50% NV in MS) | 33.4 | 33.4 |
| EHEC flatting base No. 1 (25% NV in MS) | | 33.4 |
| Total | 83.4 | 116.8 |
| Percent EHEC-LO[2] in vehicle | None | 25 |
| EHEC-LO/vehicle ratio | None | 1/3 |
| PVC, percent | 20 | 20 |
| Type films produced | High gloss | Flat |

[1] Control, i.e. without flatting base.
[2] LO is alkali refined linseed oil.

EXAMPLE 9.—FLAT ALKYD ENAMEL

*Preparation of EC flatting base No. 6*

100 parts of alkali refined linseed oil was heated to 450° F. 40 parts of T-10 Type EC was slowly added to the oil while agitating and maintaining the temperature of the mixture between 430° F. and 460° F. Agitation was continued and the temperature of the mixture kept within this range for 60 minutes after completing the addition of EC. This gave a colloidal dispersion of the EC in the oil and the fact that a drop of the dispersion on a cold glass plate was clear indicated that the dispersion was substantially complete. The resulting dispersion was thinned to a 25% nonvolatile content by mixing in 420 parts of mineral spirits having a KB of 36–38.

As soon as the above flatting base No. 6 was prepared, the EC settled out of the oil. Since attempts to stably disperse the EC in the oil were unsuccessful, which obviously is necessary in order for the EC to serve as a flatting agent, preparation of the final enamel coating composition was discontinued.

Further details are given in Table 8 below.

TABLE 8

| Films | Parts | |
|---|---|---|
| | A[1] | B[2] |
| Ingredient: | | |
| Pigment paste No. 1 | 50 | 50 |
| 60% TOFA-PE alkyd vehicle (50% NV in MS) | 33.4 | 33.4 |
| EC flatting base No. 6 (25% NV in MS) | | |
| Total | 83.4 | |
| Percent EC-LO in vehicle | None | |
| EC-LO/vehicle ratio | None | |
| PVC, percent | 20 | |
| Type film produced | High gloss | |

[1] Control, i.e. without flatting base.
[2] Could not prepare final coating composition because EC settled out of LO.

T-10 type EC designates one type of ethyl cellulose which is commercially available. It has a viscosity of 8–11 cps. (measured on a 5% solution in an 80:20 toluene:ethenol mixture by weight at 25° C.). It contains an ethoxyl content in excess of 49% (i.e. a D.S. in excess of 2.53). Although one would expect that T-10 EC would be best suited for this invention and therefore that there would be no need to try the other types of commercially available EC, I nevertheless tried these other types under substantially the same conditions as used herein for T-10 type EC and obtained essentially the same unsatisfactory results. These include G, K, and N types with ethoxyl contents and D.S. ranges of 44.5%–45.5% and 2.21–2.28 D.S., 45.5%–46.8% and 2.28–2.38 D.S., 47.5%–49.0% and 2.42–2.53 D.S., respectively.

EXAMPLE 10.—FLAT ALKYD ENAMEL

*Preparation of EC flatting base No. 7*

170 parts of alkali refined linseed oil was heated to 500° F. 30 parts of T-10 type EC was slowly added to the oil while agitating and maintaining the temperature of the mixture at 500° F. Agitation was continued and the temperature of the mixture kept at 500° F. for 85 minutes after completing the addition of EC. This gave a colloidal dispersion of the EC in the oil and the fact that a drop of the dispersion on a cold glass plate was clear indicated that the dispersion was substantially complete. The resulting dispersion was thinned to a 50% nonvolatile content by mixing in 200 parts of mineral spirits having a KB of 36–38.

*Preparation of final coating composition*

The resulting EC flatting base No. 7, the same pigment paste No. 1 and an additional amount of the same alkyd vehicle of Example 1 were mixed.

When the above final coating composition was brushed on primed wood or paperboard panels and allowed to dry under room conditions, a high gloss finish was obtained.

Further details are given in Table 9 below.

TABLE 9

| Films | Parts | |
|---|---|---|
| | A[1] | B |
| Ingredient: | | |
| Pigment paste No. 1 | 50 | 50 |
| 60% TOFA-PE alkyd vehicle (50% NV in MS) | 33.4 | 33.4 |
| EC flatting base No. 7 (50% NV in MS) | | 16.7 |
| Total | 83.4 | 100.1 |
| Percent EC-LO in vehicle | None | 25 |
| EC-LO/vehicle ratio | None | 1/3 |
| PVC, percent | 20 | 20 |
| Type films produced | High gloss | High gloss |

[1] Control, i.e. without flatting base.

EXAMPLE 11.—FLAT ALKYD ENAMEL

*Preparation of EHEC flatting base No. 8*

170 parts of dehydrated castor oil having a Gardner-Holdt viscosity of G-H was heated to 500° F. 30 parts of low viscosity EHEC was slowly added to the oil while agitating and maintaining the temperature of the mixture at 500° F. Agitation was continued and the temperature of the mixture kept at 500° F. for 90 minutes after completing the addition of EHEC. This gave a colloidal dispersion of the EHEC in the oil and the fact that a drop of the dispersion on a cold glass plate was clear indicated that the dispersion was substantially complete. The resulting dispersion was thinned to a 33.3% nonvolatile content by mixing in 400 parts of mineral spirits having a KB of 36–38.

*Preparation of final coating composition*

The resulting EHEC flatting base No. 8, the same pigment paste No. 1 and an additional amount of the same alkyd vehicle of Example 1 were mixed.

When the above final coating composition was brushed on primed wood or paperboard panels and allowed to dry under room conditions, a high gloss finish was obtained.

Further details are given in Table 10 below.

TABLE 10

| Films | Parts | |
|---|---|---|
| | A¹ | B |
| Ingredient: | | |
| Pigment paste No. 1 | 50 | 50 |
| 60% TOFA-PE alkyd vehicle (50% NV in MS) | 33.4 | 33.4 |
| EHEC flatting base No. 8 (33.3% NV in MS) | | 25 |
| Total | 83.4 | 108.4 |
| Percent EHEC-DCO in vehicle | None | 25 |
| EHEC-DCO/vehicle ratio | None | 1/3 |
| PVC, percent | 20 | 20 |
| Type films produced | High gloss | High gloss |

¹ Control, i.e. without flatting base.

EXAMPLE 12.—FLAT ALKYD ENAMEL

Preparation of EC flatting base No. 9

100 parts of dehydrated castor oil having a Gardner-Holdt viscosity of G–H was heated to 450° F. 50 parts of T–10 type EC was slowly added to the oil while agitating and maintaining the temperature of the mixture between 430° F. and 460° F. Agitation was continued and the temperature of the mixture kept within this range for 15 minutes after completing the addition of EC. This gave a colloidal dispersion of the EC in the oil and the fact that a drop of the dispersion on a cold glass plate was clear indicated that the dispersion was substantially complete. The resulting dispersion was thinned to a 33.3% nonvolatile content by mixing in 300 parts of mineral spirits having a KB of 36–38.

Preparation of final coating composition

The resulting EC flatting base No. 9, the same pigment paste No. 1 and an additional amount of the same alkyd vehicle of Example 1 were mixed.

As soon as the above final coating composition was prepared, the enamel curdled and the EC settled out. Since attempts to prepare a stable final coating composition were unsuccessful, the experiment was discontinued.

Further details are given in Table 11 below.

TABLE 11

| Films | Parts | |
|---|---|---|
| | A¹ | B |
| Ingredient: | | |
| Pigment paste No. 1 | 50 | 50 |
| 60% TOFA-PE alkyd vehicle (50% NV in MS) | 33.4 | 33.4 |
| EC flatting base No. 9 (33.3% NV in MS) | | 25 |
| Total | 83.4 | 108.4 |
| Percent EC-DCO in vehicle | None | 25 |
| EC-DCO/vehicle ratio | None | 1/3 |
| PVC, Percent | 20 | 20 |
| Type films produced | High gloss | High gloss and seedy |

¹ Control, i.e. without flatting base.

EXAMPLE 13.—FLAT ALKYD ENAMEL

Preparation of EC flatting base No. 10

100 parts of dehydrated castor oil having a Gardner-Holdt viscosity of G–H was heated to 450° F. 40 parts of T–10 type EC was slowly added to the oil while agitating and maintaining the temperature of the mixture between 430° F. and 460° F. Agitation was continued and the temperature of the mixture kept within this range for 60 minutes after completing the addition of EC. This gave a colloidal dispersion of the EC in the oil and the fact that a drop of the dispersion on a cold glass plate was clear indicated that the dispersion was substantially complete. The resulting dispersion was thinned to a 33.3% nonvolatile content by mixing in 280 parts of mineral spirits having a KB of 36–38.

Preparation of final coating composition

The resulting EC flatting base No. 10, the same pigment paste No. 1 and an additional amount of the same alkyd vehicle of Example 1 were mixed.

As soon as the above final coating composition was prepared it began to gel. The composition was brushed on primed wood or paperboard panels and allowed to dry under room conditions. Portions of the resulting film were quite seedy and those portions which were not seedy were a high gloss.

Further details are given in Table 12 below.

TABLE 12

| Films | Parts | |
|---|---|---|
| | A¹ | B |
| Ingredient: | | |
| Pigment paste No. 1 | 50 | 50 |
| 60% TOFA-PE alkyd vehicle (50% NV in MS) | 33.4 | 33.4 |
| EC flatting base No. 10 (33.3% NV in MS) | | 25 |
| Total | 83.4 | 108.4 |
| Percent EC-DCO in vehicle | None | 25 |
| EC-DCO/vehicle ratio | None | 1/3 |
| PVC, Percent | 20 | 20 |
| Type films produced | High gloss | High gloss and seedy |

¹ Control, i.e. without flatting base.

The means of determining and the terms used to designate degree of flatness of a coating composition film have long been standardized in this art. A 60° photovolt glossmeter is widely used to measure degree of flatness which is conventionally reported as gloss reading. The following terms are widely used in this art to designate coating composition films which have gloss readings falling within the ranges indicated. Flat: 10 or less, eggshell: 10–20, satin, 20–40, semigloss: 40–50, low gloss: 50–70, high gloss: 80 or greater. Sometimes a flat finish is also referred to in the art as a dead flat finish. While the glossmeter is often used, by visual observation finishes can be accurately assigned to one of the above ranges.

Although the NV content of the flatting base is not critical within a substantially wide range from a theoretical standpoint, it is quite important from a practical standpoint. For instance, the NV content can be as low as about 10% and as high as about 50%. However, with a flatting base below 10% NV the final coating composition would be so low in solids that it would require more than one coat to give a film heavy enough to provide adequate protection to the surface being coated. On the other hand, a flatting base much above 50% NV is apt to set up into a gel-like mass and thus become difficult to incorporate in the remainder of the coating composition. Flatting bases having an NV content falling within the range of about 20%–33⅓% are more practical and therefore preferred according to this invention.

As those skilled in this art will appreciate, the enamel coating compositions of this invention are nonlacquer enamels. My invention is not applicable to lacquer enamels.

The above examples illustrate specific embodiments of this invention, many modifications of which may be made therein within the scope of the invention.

Although the temperature of the EHEC carrier during incorporation of the EHEC therein may vary from about 430° F.–460° F., I have found that this temperature range is critical. At temperatures above 460° F. the EHEC is degraded and consequently does not function as a flatting agent. At temperatures below 430° F. the time required to disperse the EHEC in the carrier is undesirably long and therefore impractical.

Any degree of flatness desired in films made according to this invention can be obtained by varying (1) the EHEC/oil ratio in the flatting base, (2) concentration of the EHEC-oil dispersion in the final coating composition, (3) the KB solvency value of the thinner used, and (4) also the particular film-forming vehicle employed. The amount of EHEC which may be used in the flatting base may be expressed as EHEC/oil ratio and although this ratio can vary from 40/100–200/100, preferably this ratio will fall within the range of 40/100–100/100. The amount of EHEC flatting base can be varied from about 15% to 100% by weight based on the solids content of the coating composition. The KB solvency value of the thinners used must not exceed about 60. I have found these conditions to be critical. Operating below the 40/100 EHEC/oil ratio gives either no flatting or no substantial amount of flatting. I have found that when attempting to exceed the EHEC/oil ratio of 200/100, there is not enough oil in which to satisfactorily disperse the EHEC. Operating below the 15% EHEC flatting base amount gives unstable coating compositions. Operating above the 100% EHEC flatting base amount gives coating compositions which have viscosities that are impractically high. If the KB solvency value exceeds about 60, no flatting is obtained.

I have found that I must use a carrier for the EHEC in order to realize the benefits of this invention; that is, I have not been able to incorporate the EHEC directly into the system but must first add the EHEC to a carrier therefor and incorporate the resulting mixture into the coating composition. I have made numerous attempts to incorporate the EHEC in the coating composition without first dispersing the EHEC in a carrier. However, in every case the EHEC rapidly settled out of the coating composition, in which state of course it cannot function as a flatting agent. Various carriers are suitable. Very good results can be obtained with, for example, unbodied drying oils, including by way of illustration and not limitation, linseed oil, soybean oil, fish oil, dehydrated castor oil having a Gardner-Holdt viscosity of G-H, and tung oil. However, I am unable to obtain flatting with heat-bodied oils, because the oil-EHEC mixture is too heavy to properly disperse the EHEC in the oil.

I have also found that the type of flatting agent is critical. Insofar as I have been able to determine the flatting effect is peculiar to EHEC only. Even EC is inoperative (see Examples 9, 12 and 13).

Throughout the specification and claims of the present application I have used the terms "dispersion" and "colloidal dispersion" with reference to incorporating the EHEC in a carrier therefor and the state of the EHEC in the final coating composition. By this terminology I mean a substantially uniform distribution of the EHEC in the carrier and also of the EHEC in the final coating composition. Probably some of the EHEC is in suspension and a very small amount may even be in solution, but to the eye substantially all of the EHEC appears to be colloidally dispersed. In fact, EHEC in solution does not flat in accordance with my invention.

The viscosity of the EHEC is not critical but it is significant from a practical standpoint. At present EHEC is commercially available in three viscosity types; namely, extra low, 10–19 cps.; 20–35 cps.; and high, 125–250 cps. Low viscosity EHEC is preferred in this invention. Normally, for practical reasons in handling, in most instances one will not use the high viscosity EHEC in practicing this invention. These viscosities are conventionally measured on a 5% solution in 80:20 toluene:ethonal mixture by weight at 25° C.

Any film-forming vehicle consisting of varnishes, alkyds, hard resin solutions, or mixtures thereof may be used in this invention. The present invention is applicable to any varnish, the processes for making same being well known in the art. Varnish can vary in oil length from 1 to 100 gallons depending on the final properties desired. Likewise, the invention is useful with any alkyd, typical examples of which are those that pass Federal Specification TTR–266a, Types I and III. Instead of the tall oil fatty acid given in the examples, I may use any vegetable or marine-type unsaturated fatty acid.

The Duraplex D65A alkyd vehicle employed in the examples may be further defined as an oil modified phthalic alkyd containing about 65% soybean oil and about 24% phthalic anhydride. Pentalyn A 60M works well; it is a hard resin solution of 60% pentaerythritol ester of wood rosin in 40% mineral spirits having a KB solvency value of 36–38, and this Pentalyn solution has a Gardner-Holdt viscosity of E-H. Pentalyn K 50M works well; it is a hard resin solution of 50% pentaerythritol ester of a modified wood rosin in 50% mineral spirits having a KB solvency value of 36–38, and this Pentalyn solution has a Gardner-Holdt viscosity of T-X. Examples of other applicable hard resin solutions include glycerol ester gum, maleic ester gum, phenolic modified ester gums. Varnishes made from typical phenolic modified ester gums include the following: Amberol F-7, Pentalyn 802A, Beckacite 1126 and Plaskon 3401. Non-heat hardening or pure phenolics are also applicable. The above and other similar resins are well known in the art, and they are listed for convenient reference in the Raw Materials Index, Resin Section, published by National Paint, Varnish & Lacquer Association, Washington, D.C. This publication has no particular date of publication since it is a loose-leaf booklet kept up to date by revising one or more pages whenever necessary and each page bears the date when last revised. The disclosure of film-forming vehicles given herein are exemplary only and are not intended to limit the invention.

As pointed out previously, the above film-forming vehicles must be soluble in the solvents disclosed herein.

This invention has a number of important practical advantages. This invention substantially reduces inventories because a wide variety of coatings having varying degrees of flatness can be made using a single flatting base, whereas in the prior art practice it was necessary to provide a differently pigmented base for each degree of flatness desired in the coating. This required a large investment in machinery and labor because a different grind was necessary for each coating made having a different degree of flatness.

Another important advantage of this invention is that it substantially eliminates settling and therefore contributes to more uniform coatings. The EHEC-oil dispersion makes the coating compositions somewhat thixotropic which reduces settling and improves application characteristics. Prevention or minimizing of settling also makes it possible to obtain a coating of the desired flatness without stirring the coating composition during application, or at most only very infrequent stirring. Settling of flat and semigloss finishes during storage is a serious problem in the prior art.

A still further and quite important practical advantage of this invention is that it eliminates the necessity of using a number of auxiliary or special agents in pigmented coating compositions. These special agents which are eliminated by virtue of using the EHEC flatting base according to the present invention include bodying agents, suspending agents and antiflooding agents.

An additional and very significant advantage of this invention is that it gives films of improved surface hardness which means films having better dirt and stain removal characteristics. This is especially noticeable in flat and semigloss films.

As many apparent and widely different embodiments of this invention may be made without departing from

What I claim and desire to protect by Letters Patent is:

1. Process of preparing a nonlacquer enamel coating composition which dries to any desired degree of flatness, which comprises heating to about 430° F.–460° F. an unbodied drying oil as a carrier for ethyl hydroxyethyl cellulose, dispersing the ethyl hydroxyethyl cellulose in the heated carrier while agitating and maintaining at a temperature of about 430° F.–460° F. until all of the ethyl hydroxyethyl cellulose has been added and substantially completely dispersed in the carrier, thinning the ethyl hydroxyethyl cellulose dispersion to the desired nonvolatile content by adding thereto a petroleum aliphatic naphtha having a kauri-butanol solvency value not in excess of about 60 to form a flatting base, and incorporating with the ethyl hydroxyethyl cellulose flatting base a paste comprising a mixture of a prime pigment and a normally glossy drying nonaqueous organic film-forming vehicle selected from the group consisting of oleoresinous varnishes, oil-modified phthalic esters, spirit varnishes, the petroleum naphtha being a solvent for all film-forming vehicles employed, the ethyl hydroxyethyl cellulose/carrier ratio being 40/100–200/100, the total combined amount of ethyl hydroxyethyl cellulose, carrier and solvent being about 15%–100% by weight based on the solids content of said vehicle.

2. Process of claim 1 wherein the ethyl hydroxyethyl cellulose/carrier ratio is 40/100–100/100.

3. Process of preparing a nonlacquer enamel coating composition which dries to any desired degree of flatness, which comprises heating an unbodied drying oil to about 430° F.–460° F., dispersing ethyl hydroxyethyl cellulose in the heated unbodied drying oil while agitating and maintaining at a temperature of about 430° F.–460° F. until all of the ethyl hydroxyethyl cellulose has been added and substantially completely dispersed in the oil, thinning the ethyl hydroxyethyl cellulose dispersion to the desired nonvolatile content by adding thereto a petroleum aliphatic naphtha solvent and an aromatic hydrocarbon solvent to form a flatting base, the solvents having a combined kauri-butanol solvency value not in excess of about 60, and incorporating with the ethyl hydroxyethyl cellulose flatting base a paste comprising a mixture of a prime pigment and a normally glossy drying nonaqueous organic film-forming vehicle selected from the group consisting of oleoresinous varnishes, oil-modified phthalic esters, spirit varnishes, the solvent mixture being a solvent for all film-forming vehicles employed, the ethyl hydroxyethyl cellulose/carrier ratio being 40/100–200/100, the total combined amount of ethyl hydroxyethyl cellulose, carrier and solvent being about 15%–100% by weight based on the solids content of said vehicle.

4. Process of preparing a nonlacquer enamel coating composition which dries to any desired degree of flatness, which comprises heating an unbodied drying oil to about 430° F.–460° F., dispersing ethyl hydroxyethyl cellulose in the heated unbodied drying oil while agitating and maintaining at a temperature of about 430° F.–460° F. until all of the ethyl hydroxyethyl cellulose has been added and substantially completely dispersed in the oil, thinning the ethyl hydroxyethyl cellulose dispersion to the desired nonvolatile content by adding thereto a petroleum aliphatic naphtha having a kauri-butanol solvency value not in excess of about 60 to form a flatting base, and incorporating with the ethyl hydroxyethyl cellulose flatting base a paste comprising a mixture of a prime pigment and a normally glossy drying oleoresinous varnish, the naphtha being a solvent for said oleoresinous varnish employed, the ethyl hydroxyethyl cellulose/carrier ratio being 40/100–100/100, the total combined amount of ethyl hydroxyethyl cellulose, carrier and solvent being about 15%–100% by weight based on the solids content of said oleoresinous varnish.

5. Process of preparing a nonlacquer enamel coating composition which dries to any desired degree of flatness, which comprises heating an unbodied drying oil to about 430° F.–460° F., dispersing ethyl hydroxyethyl cellulose in the heating unbodied drying oil while agitating and maintaining at a temperature of about 430° F.–460° F. until all of the ethyl hydroxyethyl cellulose has been added and substantially completely dispersed in the oil, thinning the ethyl hydroxyethyl cellulose dispersion to the desired nonvolatile content by adding thereto a petroleum aliphatic naphtha having a kauri-butanol solvency value not in excess of about 60 to form a flatting base, and incorporating with the ethyl hydroxyethyl cellulose flatting base a paste comprising a mixture of a prime pigment and a normally glossy drying oil-modified phthalic ester, the naphtha being a solvent for said oil-modified phthalic ester employed, the ethyl hydroxyethyl cellulose/carrier ratio being 40/100–200/100, the total combined amount of ethyl hydroxyethyl cellulose, carrier and solvent being about 15%–100% by weight based on the solids content of said oil-modified phthalic ester.

6. Process of preparing a nonlacquer enamel coating composition which dries to any desired degree of flatness, which comprises heating an unbodied drying oil to about 430° F.–460° F., dispersing ethyl hydroxyethyl cellulose in the heated unbodied drying oil while agitating and maintaining at a temperature of about 430° F.–460° F. until all of the ethyl hydroxyethyl cellulose has been added and substantially completely dispersed in the oil, thinning the ethyl hydroxyethyl cellulose dispersion to the desired nonvolatile content by adding thereto a petroleum aliphatic naphtha having a kauri-butanol solvency value not in excess of about 60 to form a flatting base, and incorporating with the ethyl hydroxyethyl cellulose flatting base a paste comprising a mixture of a prime pigment and a normally glossy drying spirit varnish, the naphtha being a solvent for said spirit varnish employed, the ethyl hydroxyethyl cellulose/carrier ratio being 40/100–200/100, the total combined amount of ethyl hydroxyethyl cellulose carrier and solvent being about 15%–100% by weight based on the solids content of said spirit varnish.

7. A nonlacquer enamel coating composition which dries to any desired degree of flatness, which comprises a normally glossy drying nonaqueous organic film-forming vehicle selected from the group consisting of oleoresinous varnishes, oil-modified phthalic esters, spirit varnishes, and mixtures thereof, a prime pigment, a petroleum aliphatic naphtha solvent for said vehicle having a kauri-butanol solvency value not in excess of about 60, ethyl hydroxyethyl cellulose, and an unbodied drying oil as a carrier for said ethyl hydroxyethyl cellulose, the ethyl hydroxyethyl cellulose/carrier ratio being 40/100–200/100, the total combined amount of ethyl hydroxyethyl cellulose, carrier and solvent being about 15%–100% by weight based on the solids content of said vehicle.

8. The nonlacquer enamel coating composition of claim 7 wherein the ethyl hydroxyethyl cellulose/carrier ratio is 40/100–100/100.

9. A nonlacquer enamel coating composition which dries to any desired degree of flatness, which comprises a normally glossy drying nonaqueous organic film-forming vehicle selected from the group consisting of oleoresinous varnishes, oil-modified phthalic esters, spirit varnishes, and mixtures thereof, a prime pigment, a petroleum aliphatic naphtha and an aromatic hydrocarbon which are solvents for said vehicle, the solvents having in combination a kauri-butanol value not in excess of about 60, an unbodied drying oil, and ethyl hydroxyethyl cellulose uniformly distributed throughout the coating composition, the ethyl hydroxyethyl cellulose/carrier ratio being 40/100–200/100, the total combined amount of ethyl hydroxyethyl cellulose, carrier and solvent being about 15%–100% by weight based on the solids content of said vehicle.

10. A nonlacquer enamel coating composition which dries to any desired degree of flatness, which comprises a normally glossy drying oleoresinous varnish, a prime pigment, a petroleum aliphatic naphtha solvent for the oleoresinous varnish, the solvent having a kauri-butanol value not in excess of about 60, an unbodied drying oil, and ethyl hydroxyethyl cellulose uniformly distributed throughout the coating composition, the ethyl hydroxyethyl cellulose/carrier ratio being 40/100–200/100, the total combined amount of ethyl hydroxyethyl cellulose, carrier and solvent being about 15%–100% by weight based on the solids content of said oleoresinous varnish.

11. A nonlacquer enamel coating composition which dries to any desired degree of flatness, which comprises a normally glossy drying oil-modified phthalic ester, a prime pigment, a petroleum aliphatic naphtha solvent for the oil-modified phthalic ester, the solvent having a kauri-butanol value not in excess of about 60, an unbodied drying oil, and ethyl hydroxyethyl cellulose uniformly distributed throughout the coating composition, the ethyl hydroxyethyl cellulose/carrier ratio being 40/100–200/100, the total combined amount of ethyl hydroxyethyl cellulose, carrier and solvent being about 15%–100% by weight based on the solids content of said oil-modified phthalic ester.

12. A nonlacquer enamel coating composition which dries to any desired degree of flatness, which comprises a normally glossy drying spirit varnish, a prime pigment, a petroleum aliphatic naphtha solvent for the spirit varnish, the solvent having a kauri-butanol value not in excess of about 60, an unbodied drying oil, and ethyl hydroxyethyl cellulose uniformly distributed throughout the coating composition, the ethyl hydroxyethyl cellulose/carrier ratio being 40/100–200/100, the total combined amount of ethyl hydroxyethyl cellulose, carrier and solvent being about 15%–100% by weight based on the solids content of said spirit varnish.

References Cited by the Examiner

UNITED STATES PATENTS

| 2,148,601 | 2/39 | Bucy | 260—13 |
| 2,362,876 | 11/44 | Balassa | 106—172 |
| 3,071,484 | 1/63 | Larson | 260—13 |

JOSEPH L. SCHOFER, *Primary Examiner.*

LEON J. BERCOVITZ, *Examiner.*

UNITED STATES PATENT OFFICE
CERTIFICATE OF CORRECTION

Patent No. 3,197,424                                    July 27, 1965

Victor J. Larson

It is hereby certified that error appears in the above numbered patent requiring correction and that the said Letters Patent should read as corrected below.

Column 6, TABLE 5, column 3, line 2 thereof, for "1..9" read -- 17.9 --; column 11, line 68, before "20-35 cps" insert -- low, --; column 13, line 72, for "100/100" read -- 200/100 --.

Signed and sealed this 8th day of February 1966.

(SEAL)
Attest:

ERNEST W. SWIDER
Attesting Officer

EDWARD J. BRENNER
Commissioner of Patents